US012648574B2

(12) United States Patent　　　　(10) Patent No.:　US 12,648,574 B2
Ballesta Perez et al.　　　　　　　　(45) Date of Patent:　　Jun. 9, 2026

(54) PHYTOSANITARY COMPOSITION FOR USE AS A BACTERICIDE

(71) Applicant: LAINCO, S.A., Rubi (ES)

(72) Inventors: Jordi Ballesta Perez, Rubi (ES); Antonio Miguel Lavado Llamas, Rubi (ES); Hugo Cores Aragunde, Rubi (ES)

(73) Assignee: LAINCO, S.A., Rubi (ES)

( * ) Notice: Subject to any disclaimer, the term of this patent is extended or adjusted under 35 U.S.C. 154(b) by 777 days.

(21) Appl. No.: 17/773,398

(22) PCT Filed: Oct. 26, 2020

(86) PCT No.: PCT/ES2020/070649
§ 371 (c)(1),
(2) Date: Apr. 29, 2022

(87) PCT Pub. No.: WO2021/084147
PCT Pub. Date: May 6, 2021

(65) Prior Publication Data
US 2022/0378052 A1　　Dec. 1, 2022

(30) Foreign Application Priority Data

Oct. 29, 2019　(ES) ................................ ES201930950

(51) Int. Cl.
| | |
|---|---|
| *A01N 65/28* | (2009.01) |
| *A01N 25/02* | (2006.01) |
| *A01N 25/24* | (2006.01) |
| *A01N 25/30* | (2006.01) |
| *A01N 43/90* | (2006.01) |
| *A01P 1/00* | (2006.01) |

(52) U.S. Cl.
CPC ............. *A01N 65/28* (2013.01); *A01N 25/02* (2013.01); *A01N 25/30* (2013.01); *A01P 1/00* (2021.08)

(58) Field of Classification Search
None
See application file for complete search history.

(56) References Cited

U.S. PATENT DOCUMENTS

2004/0037899 A1 *　2/2004　Ryan ...................... A01N 65/36
424/778

FOREIGN PATENT DOCUMENTS

| | | | |
|---|---|---|---|
| CN | 103828847 A | | 4/2014 |
| JP | H06116111 A | | 4/1994 |
| JP | 2004196766 A | * | 7/2004 |
| WO | 0221926 A2 | | 3/2002 |
| WO | WO-2020226482 A1 | * | 11/2020 |

OTHER PUBLICATIONS

JP2004/196766A—Google English Translation (Year: 2004).*
(Continued)

*Primary Examiner* — Kyung S Chang
(74) *Attorney, Agent, or Firm* — Merchant & Gould P.C.; Daniel R. Evans; Jenna L. Logsdon

(57) ABSTRACT

The present invention relates to a phytosanitary composition with bactericidal effect comprising eucalyptus oil, at least one diluent, at least one surfactant and at least one antioxidant, and the use of such composition as a bactericide in the protection of plants.

6 Claims, 6 Drawing Sheets

(56) References Cited

OTHER PUBLICATIONS

Kokina et al, "Characterization, Antioxidant and Antibacterial Activity of Essential Oils and Their Encapsulation into Biodegradable Material Followed by Freeze Drying", Food Technology & Biotechnology, Apr.-Jun. 2019, pp. 282-290 (Year: 2019).*

Sabir et al. "Evaluation of the Potential of Some Essential Oils in Biological Control against Phytopathogenic Agent Pseudomonas syringae pv. Tomato DC3000 Responsible for the Tomatoes Speck", Journal of Plant Pathology & Microbiology, vol. 08, No. 09, pp. 1-8, publication date: 2017092 (Year: 2017).*

NC state (extension), "Bacterial Leaf Spot on Greenhouse Ornamentals", published on Jan. 13, 2019, pp. 1-8 (Year: 2019).*

Kusuma et al., "Antimicrobial lotion containing red Piper betle leaf (Piper crocatum Ruiz and Pav) ethanolic extract for topical application", National Journal of Physiology, Pharmacy and Pharmacology, 2017, pp. 130-138. (Year: 2017).*

International Search Report issued in connection with PCT Application No. PCT/ES2020/070649 dated Dec. 17, 2020.

* cited by examiner

PHYTOSANITARY COMPOSITION FOR USE AS A BACTERICIDE

CROSS-REFERENCE TO RELATED APPLICATIONS

This is a 35 U.S.C. 371 National Stage Patent Application of International Application No. PCT/ES2020/070649, filed Oct. 26, 2020, which claims priority to Spanish application P201930950, filed Oct. 29, 2019, each of which is hereby incorporated by reference in its entirety.

BACKGROUND

Numerous scientific studies around the world have addressed the problem of agriculture in the twenty-first century as being particularly sensitive to climate change, which has led to the spread of phytopathogenic bacteria. Therefore, there is a clear and urgent need to contain this type of risk in agricultural production.

Eucalyptus oil has been described as useful as an insect and miscellaneous animal repellent (US20110171278A1).

E. R. Hendry et al. describe the synergistic antimicrobial effect of chlorhexidine digluconate and eucalyptus oil (*Journal of Antimicrobial Chemotherapy* (2009) 64, 1219-1225 and *Int J Mol Sci.* 2012; 13(11): 14016-14025).

To date, although the antimicrobial activity of eucalyptus oil has been described in a general way or combined with other active ingredients, a stable, environmentally friendly and easy-to-use composition in plant protection based on eucalyptus oil that is effective against numerous bacterial infections has not been described.

Therefore, there is a need for new compositions that are more environmentally friendly that at the same time are highly effective in preventing bacterial infections in plant crops. Likewise, it is necessary that these compositions are stable at high concentrations and at room temperature, and that once diluted for use in plants, they manage to prevent bacterial growth without being toxic to the treated plants.

DESCRIPTION OF THE INVENTION

The present invention represents a solution to the problem described above, as it describes highly effective and environmentally friendly bactericidal phytosanitary compositions. Inventors have found that the use of eucalyptus oil derived from *Eucalyptus globulus* in certain concentrations is highly effective against numerous bacterial infections that significantly affect fruit trees and some horticultural trees.

The present invention relates to a liquid composition comprising eucalyptus oil in an amount sufficient for the composition to comprise between 5 and 80% w/v of 1,8-cineole for use as a bactericide in plant protection, wherein said composition is applied to plants after being diluted in water up to between 0.01 and 12% by weight. In one embodiment, the composition is applied to the plants after being diluted in water up to between 0.02 and 12, 0.05 and 12, 0.10 and 10, 0.20 and 10, 0.50 and 10, 1 and 10, 2 and 8, 3 and 7% by weight. In a preferred embodiment, the composition is applied to the plants after being diluted in water up to 3-5% or up to 4% by weight. In the field, it is common to prepare dilutions in % by volume. In this sense, this invention refers to applications after diluting the composition of the invention up to between 0.01 and 12% by volume. In one embodiment, the composition is applied to the plants after being diluted in water up to between 0.02 and 12, 0.05 and 12, 0.10 and 10, 0.20 and 10, 0.50 and 10, 1 and 10, 2 and 8, 3 and 7% by volume. In a preferred embodiment, the composition is applied to the plants after being diluted in water up to 3-5% or up to 4% by volume. For example, this application describes dilutions at 0.4% by volume applied by irrigation and effective against *X. fastidiosa* in almond trees. In the field, this is equivalent to a dilution of 4 liters/ha, considering that 1,000 liters per ha $(10,000 \text{ m}^2)$ are used.

The compositions of the present invention can be prepared more or less concentrated to be subsequently diluted later for use, preferably by application on plants by spraying. Such dilution is done in water and is usually done in the field. Therefore, to facilitate its handling, it is advantageous to have concentrated compositions that are diluted in situ before application. The compositions of the present invention have been tested preferably at concentrations of eucalyptus oil to provide 20% w/v of 1,8-cineole, which have been diluted after use in different proportions, as described in the examples.

In a preferred embodiment, this composition is applied to plants after being diluted in water up to between 0.1 and 5% by weight. In a more preferred embodiment, this composition is applied to plants after being diluted in water up to between 0.2 and 1.0% by weight. In a preferred embodiment, this composition is applied to plants after being diluted in water up to between 0.1 and 5% by volume. In a more preferred embodiment, this composition is applied to plants after being diluted in water up to between 0.2 and 1.0% by volume.

In a preferred embodiment, the composition does not comprise chlorhexidine. Preferably, it does not comprise chlorhexidine digluconate. In a preferred embodiment of the present invention, the composition does not comprise nim or neem tree oil. In a preferred embodiment, the composition does not comprise thyme oil.

As used herein, the term "1,8-cineole" refers to eucalyptol or 1,3,3-Trimethyl-2-oxabicyclo[2,2,2]octane, which is the main compound in eucalyptus oil. As used here, the term "eucalyptus oil" refers to the oil obtained by distilling twigs and leaves of *Eucalyptus globulus*.

In a preferred embodiment of the first aspect, the composition for use as a bactericide in plant protection is used against infections of *Xylella fastidiosa, Pseudomonas syringae, Xanthomonas fragariae, Xanthomonas axonopodis, Xanthomonas arboricola, Erwinia amylovora* or any combination thereof. Preferably, it is used against infections of *Xylella fastidiosa* or *Pseudomonas syringae*.

The compositions of the present invention have proven to be highly effective against infections caused by the bacteria mentioned above, especially highlighting the magnificent results obtained against *Xylella fastidiosa* infections.

In another preferred embodiment, the composition of the first aspect is applied to fruit and horticultural trees, preferably to grapevine, olive, almond, hazelnut, walnut, kiwi, tomato, strawberry, potato, peach, apricot, plum, orange, lemon, mandarin, apple tree, pear, quince, coffee tree. Preferably, protection applies to the pear tree, almond tree or olive tree.

In a preferred embodiment of the first aspect, the composition for use as a bactericide in plant protection comprises eucalyptus oil in a sufficient amount for the composition to comprise between 15 and 25% w/v of 1,8-cineole. Preferably, it comprises eucalyptus oil in a sufficient amount so that the composition comprises between 16 and 24 or between 17 and 23 or between 18 and 22 or between 19 and 21% w/v of 1,8-cineole.

In a preferred embodiment of the first aspect, the composition for use as a bactericide in plant protection comprises eucalyptus oil in an amount sufficient for the composition to comprise 20% w/v of 1,8-cineole.

In a preferred embodiment of the first aspect, the composition for use as a bactericide in plant protection comprises between 40 and 70% w/v of a diluent or diluents. Diluents may be selected from water, a vegetable or animal oil or mixtures of fatty acids and their esters, at least one paraffinic mineral oil, at least one $C_{16}$-$C_{18}$ methyl ester, at least one $C_1$-$C_5$ alcohol, cyclohexanone, acetophenone, xylene, aromatic naphtha or mixtures thereof. Preferably, at least one diluent is water. In a preferred embodiment, this composition comprises between 40 and 70% w/v of water. Preferably, it comprises between 45 and 65 or between 40 and 65 or between 45 and 60 or between 45 and 55% w/v of water.

In a preferred embodiment of the first aspect, the composition for use as a bactericide in plant protection comprises between 1.00 and 8.00% w/v of surfactant or surfactants. In a embodiment, the composition comprises between 1 and 7 or between 2 and 7 or between 3 and 6 or between 3 and 5% w/v of surfactant or surfactants.

In a preferred embodiment of the first aspect, the composition for use as a bactericide in plant protection comprises 0.10 and 1.00% w/v of an antioxidant or antioxidants. In a embodiment, the composition comprises between 0.20 and 0.90 or between 0.30 and 0.80 or between 0.40 and 0.80 or between 0.20 and 0.80% w/v of an antioxidant or antioxidants.

Where the main diluent is water, the composition may comprise up to 15% w/v of a codiluent selected from a vegetable or animal oil or mixtures of fatty acids and their esters, at least one mineral oil of the paraffinic type, at least one $C_{16}$-$C_{18}$ methyl ester, at least one $C_1$-$C_5$ alcohol, cyclohexanone, acetophenone or mixtures thereof, although preferably the codiluent is a vegetable oil.

In a preferred embodiment of the first aspect, the composition for use as a bactericide in plant protection further comprises at least one diluent, at least one surfactant, at least one antioxidant and at least one viscosizer in a sufficient amount so that the viscosity of the composition is between 500 and 5000 cP, calculated according to the CIPAC MT 192 method with a rotational viscometer with needle 2, 20 rpm and at 25° C.

In a preferred embodiment of the first aspect, the composition for use as a bactericide in plant protection comprises between 0.10 and 5.00% w/v of a viscosizer or viscosizers. In a embodiment, the composition comprises between 0.20 and 5.00 or between 0.50 and 5.00 or between 0.50 and 4.00 or between 1.00 and 3.00% w/v of viscosizer or viscosizers.

In a preferred embodiment of the first aspect, the composition for use as a bactericide in plant protection has a volumetric distribution of particle size with d10 between 0.1 and 5 microns and d90 between 0.8 and 50 microns, measured by laser diffraction according to the CIPAC MT 187 method.

A second aspect of the present invention relates to a liquid composition comprising eucalyptus oil in an amount sufficient for the composition to comprise between 10 and 30, or between 15 and 25 or between 18 and 22 or 20% w/v of 1,8-cineole, at least one diluent, at least one surfactant and at least one antioxidant.

In a preferred embodiment of the second aspect, eucalyptus oil is the only ingredient with bactericidal effect of the composition.

The composition of the present invention is stable at room temperature for at least 24 months. This means that it maintains its viscosity characteristics, particle size, pH, etc. and, in addition and, above all, maintains its effectiveness when kept at room temperature for at least 24 months.

In a preferred embodiment of the second aspect, the composition does not comprise nim or neem tree oil. In a preferred embodiment, the composition does not comprise thyme oil.

In a preferred embodiment of the second aspect, the composition comprises eucalyptus oil in a sufficient amount for the composition to comprise between 16 and 25% w/v of 1,8-cineole. Preferably, the composition comprises eucalyptus oil in a sufficient amount so that the composition comprises between 18.00 and 22.00% w/v of 1.8-cineole. In a more preferred embodiment, the composition comprises eucalyptus oil in a sufficient amount for the composition to comprise 20% w/v of 1,8-cineole.

In a preferred embodiment of the second aspect, the composition comprises between 40 and 70% w/v of a diluent or diluents. Preferably, at least one diluent is water. Preferably, it comprises between 45 and 65 or between 40 and 65 or between 45 and 60 or between 45 and 55% w/v of water. In a preferred embodiment of the second aspect, the composition comprises between 40 and 70% w/v of water. Preferably, water is osmotic water.

In a preferred embodiment of the second aspect, the composition comprises between 1.00 and 8.00% w/v of a surfactant or surfactants. In a embodiment, the composition comprises between 1 and 7 or between 2 and 7 or between 3 and 6 or between 3 and 5% w/v of a surfactant or surfactants.

In a preferred embodiment of the second aspect, the composition comprises between 0.10 and 1.00% w/v of an antioxidant or antioxidants. In a embodiment, the composition comprises between 0.20 and 0.90 or between 0.30 and 0.80 or between 0.40 and 0.80 or between 0.20 and 0.80% w/v of an antioxidant or antioxidants.

In a preferred embodiment of the second aspect, the composition also comprises at least one viscosizer in a sufficient amount so that the viscosity of the composition is between 500 and 5000 cP, calculated according to the CIPAC MT 192 method with a rotational viscometer with needle 2, 20 rpm and at 25° C. In a preferred embodiment of the second aspect, the composition comprises between 0.10 and 5.00% w/v of a viscosizer or viscosizers. In an embodiment, the composition comprises between 0.20 and 5.00 or between 0.50 and 5.00 or between 0.50 and 4.00 or between 1.00 and 3.00% w/v of a viscosizer or viscosizers. In a preferred embodiment of the second aspect, the composition comprises a sufficient amount of viscosizer(s) so that the viscosity of the composition is between 500 and 1500 cP, calculated according to the CIPAC MT 192 method with a rotational needle viscometer 2, 20 rpm and at 25° C.

In a preferred embodiment of the second aspect, the composition has a volumetric particle size distribution with d10 between 0.1 and 5 microns and a d90 between 0.5 and 50 microns, preferably a d10 between 0.1 and 2 microns and a d90 between 0.5 and 8 microns, measured by laser diffraction according to the CIPAC MT 187 method.

In a preferred embodiment of the second aspect, the composition comprises in addition to water another codiluent selected from at least one vegetable or animal oil or mixtures of fatty acids and their esters, at least one mineral oil of paraffinic type, at least one $C_{16}$-$C_{18}$ methyl ester, at least one $C_1$-$C_5$ alcohol, cyclohexanone, acetophenone, xylene, aromatic naphtha or mixtures thereof.

In a preferred embodiment of the second aspect, the composition comprises as diluents water and at least one vegetable oil. Preferably, the composition comprises as diluents water and sesame oil.

In a preferred embodiment of the second aspect, the composition comprises as surfactant at least one selected from ethoxylated castor oil, ethoxylated sorbitan esters (polysorbates), derivatives of polyethoxylated fatty alcohols, polyarylphenyl ether phosphate, a polymeric surfactant of high molecular weight and low hydrophilic-lipophilic balance (HLB) and a high HLB polymeric surfactant consisting of ethylene oxide/propylene oxide block copolymers.

In a preferred embodiment of the second aspect, the composition comprises as surfactant at least one selected from among derivatives of polyethoxylated fatty alcohols, polyarylphenyl ether phosphate, a polymeric surfactant of high molecular weight and low HLB and a high HLB polymeric surfactant formed by ethylene oxide/propylene oxide block copolymers.

In a third aspect, the present invention relates to the composition of the second aspect for use as a phytosanitary product. Preferably, for use as a bactericide in the protection of plants, preferably for the protection of fruit and horticultural trees, more preferably for the protection of vine, olive, almond, hazel, walnut, kiwi, tomato, strawberry, potato, peach, apricot, plum, orange, lemon, mandarin, apple tree, pear, quince, coffee or any combination thereof.

In a preferred embodiment of the third aspect, the composition of the second aspect is used as a bactericide in the protection of plants, preferably for the protection of fruit and horticultural trees, more preferably for the protection of grapevine, olive, almond, hazel, walnut, kiwi, tomato, strawberry, potato, peach, apricot, plum, orange, lemon, mandarin, apple tree, pear, quince, coffee tree or any combination thereof, against infections of *Xylella fastidiosa, Pseudomonas syringae, Xanthomonas fragariae, Xanthomonas axonopodis, Xanthomonas arboricola, Erwinia amylovora* or any combination thereof, preferably against infection of *Xylella fastidiosa* or *Pseudomonas syringae*. Preferably, the infection is *Xylella fastidiosa* subesp. *fastidiosa* or subesp. *multiplex*.

EXAMPLES

Figure 1:
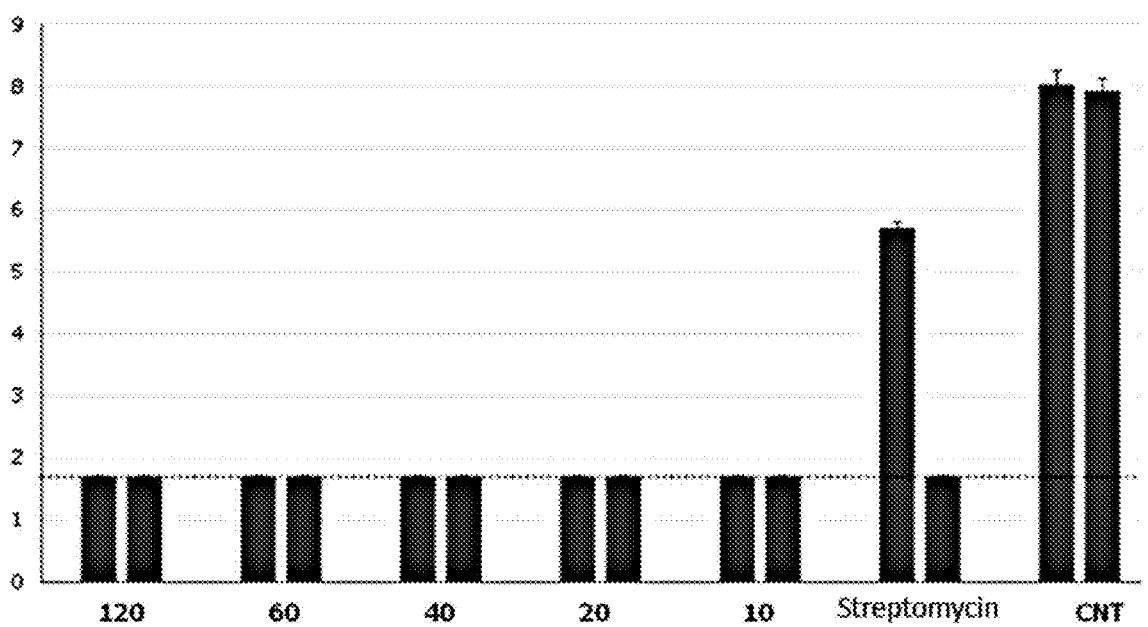
FIG. 1. Survival of *E. amylovora* depending on the treatment applied after 30 min (left bar) and 2 h (right bar) of contact with the product. The ordinate axis shows survival in Log CFU/ml and the abscissa axis shows product concentration in µl/ml, streptomycin (100 mg/L) and control (CNT). The bars represent the average of the values observed in the three repetitions performed for each treatment and time. The error bars show the confidence interval taking into account the standard deviation. (---), limit of detection of the technique.

This invention will be better understood by reference to the examples below, but those experts in the art will easily appreciate that the specific examples detailed are only illustrative of the invention.

Example 1: Compositions

Below are some compositions of the invention where the quantities of each component are in % w/v.

The compositions must be diluted prior to their use in plant protection. These compositions, once diluted in 1% water (w/v) presented a pH of between 4.00 and 6.50 at room temperature (25° C.).

In compositions 9 to 15, the major diluent was osmotic water. In addition, vegetable and/or animal oils or mixtures of fatty acids and their esters, paraffinic mineral oils, methyl esters of between 16 and 18 carbons, alcohols of between one and five carbons, or others such as cyclohexanone or acetophenone were optionally used as a codiluent. The surfactants used were at least one selected from ethoxylated castor oil, ethoxylated sorbitan esters (polysorbates), derivatives of polyethoxylated fatty alcohols, such as ethoxylated tristyrilphenols, polyarylphenyl ether phosphate (amine salt), high molecular weight and low polymeric surfactant hydrophilic-lipophilic (HLB) balance, and high HLB polymeric surfactant formed by ethylene oxide/propylene oxide block copolymers.

The particle size of the compositions was analyzed according to the CIPAC MT 187 method with a Mastersizer 3000E (optical unit) and a Hydro SM dispersion unit. All compositions featured a dv10 between 0.1 and 5 microns and a dv90 between 0.5 and 50 microns.

The viscosity of the compositions was analyzed according to the CIPAC MT 192 method with a rotational viscometer with 2, 20 rpm needle and at 25° C. (Brookfield equipment model DV1MLVTJ0). All compositions presented a viscosity between 500 and 5000 cP, or between 500 and 1500 cP.

Example 2: Assessment of Antimicrobial Activity by Incorporation Test in Agar The product of the present invention was tested against quarantine phytopathogenic bacteria. The tested product

| Component | 1 | 2 | 3 | 4 |
|---|---|---|---|---|
| *Eucalyptus globulus** | 5.00-40.00 | 5.00 | 15.00 | 20.00 |
| Diluent(s) | 40.00-85.00 | qs | qs | qs |
| Surfactant(s) | 1.00-8.00 | 1.00-8.00 | 1.00-8.00 | 1.00-8.00 |
| Antioxidant(s) | 0.10-1.00 | 0.10-1.00 | 0.10-1.00 | 0.10-1.00 |
| Viscosizer(s) | 0.10-5.00 | 0.10-5.00 | 0.10-5.00 | 0.10-5.00 |

| Component | 5 | 6 | 7 | 8 |
|---|---|---|---|---|
| *Eucalyptus globulus** | 25.00 | 30.00 | 35.00 | 40.00 |
| Diluent(s) | qs | qs | qs | qs |
| Surfactant(s) | 1.00-8.00 | 1.00-8.00 | 1.00-8.00 | 1.00-8.00 |
| Antioxidant(s) | 0.10-1.00 | 0.10-1.00 | 0.10-1.00 | 0.10-1.00 |
| Viscosizer(s) | 0.10-5.00 | 0.10-5.00 | 0.10-5.00 | 0.10-5.00 |

| Component | 9 | 10 | 11 | 12 |
|---|---|---|---|---|
| *Eucalyptus globulus** | 15.00 | 20.00 | 25.00 | 30.00 |
| Water | 55.00 | 50.00 | 45.00 | 40.00 |
| Co-diluent | 0-20.00 | 0-20.00 | 0-20.00 | 0-20.00 |
| Surfactant | 1.00-8.00 | 1.00-8.00 | 1.00-8.00 | 1.00-8.00 |
| Antioxidant | 0.10-1.00 | 0.10-1.00 | 0.10-1.00 | 0.10-1.00 |
| Viscosizer | 0.10-5.00 | 0.10-5.00 | 0.10-5.00 | 0.10-5.00 |

| Component | 13 | 14 | 15 |
|---|---|---|---|
| *Eucalyptus globulus** | 20.00 | 20.00 | 20.00 |
| Osmotic water | 59.40 | 65.40 | 52.80 |
| Co-diluent(s) | 15.00 | 10.00 | 15.00 |
| Surfactant(s) | 4.00 | 2.00 | 7.00 |
| Antioxidant(s) | 0.60 | 0.20 | 0.80 |
| Viscosizer(s) | 0.60 | 2.00 | 4.00 |
| Antifoaming(s) | 0.40 | 0.40 | 0.40 |

*% w/v refers to the amount in % w/v of 1,8-cineole, so the composition comprises the amount of eucalyptus oil derived from *Eucalyptus globulus* needed to comprise the desired w/v percentage of 1,8-cineole, which is quantified by HPLC.

comprised eucalyptus oil in an amount so that the final composition had 20% w/v of 1,8-cineole, measured by HPLC, and was preserved at room temperature.

The efficacy of the product was tested against 11 phytopathogenic strains from the collection of quarantine pathogens of the Center for Innovation and Development in Plant Health (CIDSAV), from European foci of infection or from Spanish type collections (Table 1).

TABLE 1

| Description of the phytopathogenic strains used in the antimicrobial activity tests | | |
| --- | --- | --- |
| Phytopathogenic bacteria | Strain used | Origin |
| Erwinia amylovora | EPS 101 | Girona |
| Xanthomonas arboricola pv. pruni | CFBP 5563 | Francia |
| Pseudomonas syringae pv. actinidiae | IVIA 3700.1.1 | Portugal |
| Pseudomonas syringae pv. tomato | DC 3000 | Malaga |
| Pseudomonas syringae pv. syringae | EPS 94 | Girona |
| Xanthomonas fragariae | 349-9$^a$ | Spain |
| Xanthomonas axonopodis pv. vesicatoria | IVIA 2133.2 | Spain |
| Ralstonia solanacearum | CECT 125 | CECT |
| Xylella fastidiosa subsp. fastidiosa | IVIA 5387.2 | Balearic Islands |
| Xylella fastidiosa subsp. multiplex | IVIA 5901.2 | Valencia |
| Xylella fastidiosa subsp. Pauca | DD1 CODiRo | Italy |

The inocula were obtained from the pure culture of the actively growing strains after seeding in BCYE agar medium in the case of the three subspecies of *Xylella fastidiosa*, in medium B agar for *Xanthomonas fragariae* and in medium LB agar for the rest of quarantine phytopathogenic bacteria. They were then incubated at 28° C. for 48 hours. In the case of *X. fastidiosa* the incubation time was increased between 7-10 days. Each bacterial suspension was prepared at a final concentration of $1 \times 10^8$ CFU/ml.

The antimicrobial activity of 5 doses of the product was tested against 11 strains of bacterial pathogens. Specifically, the following concentrations were used: 120, 60, 30, 10 and 5 μl/ml of the product. In addition, the effect was compared with that of the antibiotic streptomycin at a concentration of 100 mg/L. An untreated control was also added, where the product was replaced by sterile distilled water.

To carry out the tests, solid culture plates were prepared where the product was incorporated at the corresponding dose. For each strain, the appropriate culture medium was used. A 10 μl drop of the corresponding bacterial suspension at $10^8$ CFUs/ml was then deposited on each plate. The plates were then allowed to dry and incubated at 28° C. for 48 hours. In the case of *X. fastidiosa* the incubation time was increased between 7-10 days. After this time, bacterial growth was observed in each of the doses tested, and compared with the untreated control, which corresponded to the bacterial suspension of the pathogen incubated in a medium without product. For each of the treatments, 2 repetitions were performed.

The in vitro inhibitory activity of the product was determined by determining the minimum inhibitory concentration. In addition, the effect of the product was compared with that of the reference bactericide streptomycin. Previously, the absence of contaminating microorganisms in the product was confirmed, which could interfere with the test.

Table 2 shows a summary of the inhibitory activity of the product against the 11 strains of phytopathogenic bacteria tested.

Generally speaking, the observed antimicrobial activity depended on the concentration of the product and the pathogen used. The three subspecies of *Xylella fastidiosa* were the strains most sensitive to treatment with the product, since at the lowest dose tested (5 μl/ml) it inhibited the growth of bacteria.

In contrast, *E. amylovora* was the most resistant pathogen, with growth observed at a concentration of 60 μl/ml of the product (MIC 60-120 μl/l).

The antibiotic streptomycin (100 mg/L) inhibited the growth of all pathogens tested.

Growth of all strains could be observed in the control plates without product, after 48 h after incubation.

TABLE 2

In vitro antibacterial activity of the 5 tested doses of the product against 11 quarantine phytopathogenic bacteria. The results obtained for the two repetitions are shown.
Strep: streptomycin (100 mg/L) used as antibacterial control;
+: bacterial growth equal to that observed in the untreated control
+/−: bacterial growth lower than that observed in untreated control (CNT)
−: no bacterial growth is observed.

| | | Product Dose (μl/ml) | | | | | | |
| --- | --- | --- | --- | --- | --- | --- | --- | --- |
| | | 120 | 60 | 30 | 10 | 5 | Strep | CNT |
| E. amylovora | R1 | − | + | + | + | + | − | + |
| | R2 | − | + | + | + | + | − | + |
| X. arboricola pv. pruni | R1 | − | − | − | + | + | − | + |
| | R2 | − | − | − | + | + | − | + |
| P. syringae pv. actinidiae | R1 | − | − | − | +/− | + | − | + |
| | R2 | − | − | − | +/− | + | − | + |
| P. syringae pv. syringae | R1 | − | − | + | + | + | − | + |
| | R2 | − | − | + | + | + | − | + |
| P. syringae pv. tomato | R1 | − | − | +/− | + | + | − | + |
| | R2 | − | − | +/− | + | + | − | + |
| X. fragariae | R1 | − | − | − | − | − | − | + |
| | R2 | − | − | − | − | +/− | − | + |
| X. axonopodis pv. vesicatoria | R1 | − | − | − | + | + | − | + |
| | R2 | − | − | − | + | + | − | + |
| Ralstonia solanacearum | R1 | − | − | +/− | + | + | − | + |
| | R2 | − | − | +/− | + | + | − | + |
| Xylella fastidiosa subsp. fastidiosa | R1 | − | − | − | − | − | − | + |
| | R2 | − | − | − | − | − | − | + |
| Xylella fastidiosa subsp. multiplex | R1 | − | − | − | − | − | − | + |
| | R2 | − | − | − | − | − | − | + |
| Xylella fastidiosa subsp. pauca | R1 | − | − | − | − | − | − | + |
| | R2 | − | − | − | − | − | − | + |

The minimum inhibitory concentration (MIC) was determined as the lowest product concentration at which no bacterial growth occurred at the end of the experiment. The value (range) of the MICs against the different strains are shown in Table 3.

TABLE 3

Minimum inhibitory concentrations (MICs) obtained for the 11 quarantine phytopathogenic bacteria.

| Patthogen | MIC (µl/ml) |
|---|---|
| E. amylovora | 60-120 |
| X. arboricola pv. pruni | 10-30 |
| P. syringae pv. Actinidiae | 10-30 |
| P. syringae pv. syringae | 30-60 |
| P. syringae pv. tomato | 30-60 |
| X. fragariae | <5 |
| X. axonopodis pv. vesicatoria | 10-30 |
| Ralstonia solanacearum | 30-60 |
| Xylella fastidiosa subsp. fastidiosa | <5 |
| Xylella fastidiosa subsp. multiplex | <5 |
| Xylella fastidiosa subsp. pauca | <5 |

It is observed that the MIC of E. amylovora would be between doses 120 and 60 µl/ml. P. syringae pv. syringae, P. syringae pv. tomato and R. solanacearum, would present MIC values between 30 and 60 µl/ml. For X. arboricola pv. pruni, P. syringae pv. actinidiae and X. axonopodris pv. vesicatoria, the MIC would be between 10 and 30 µl/ml. X. fragariae (in one of the replicas) and the three subspecies of Xylella fastidiosa had a MIC of less than 5 µl/ml.

In summary, the product presents a MIC in the range of 5-60 µl/ml (5-60 ppm) against the 11 phytopathogenic strains studied. If we extrapolate the MIC obtained in vitro for field use (approximately 10×CMI), the required dose would be within the usual range of phytosanitary application (50-100 ppm).

In conclusion, the product has antimicrobial activity against the 11 phytopathogenic bacteria tested.

Example 3: Evaluation of Bactericidal Activity by Contact Test

The efficacy of the product was evaluated against the following 5 phytopathogenic strains from the CIDSAV collection of quarantine pathogens, from European foci of infection or from Spanish type collections. The tested product comprised eucalyptus oil in sufficient amount to have 20% w/v of 1,8-cineole (measured by HPLC) and was stored at room temperature.

| Phytopathogenic bacteria | Strain used | Origin |
|---|---|---|
| Erwinia amylovora | EPS 101 | Girona |
| Xanthomonas arboricola pv. pruni | CFBP 5563 | France |

-continued

| Phytopathogenic bacteria | Strain used | Origin |
|---|---|---|
| Pseudomonas syringae pv. actinidiae | IVIA 3700.1.1 | Portugal |
| Pseudomonas syringae pv. tomato | DC 3000 | Malaga |
| Xanthomonas axonopodis pv. vesicatoria | IVIA 2133.2 | Spain |

The inocula were obtained from the pure culture of the actively growing strains after seeding in LB agar medium and incubation at 28° C. for 24 hours. Each bacterial suspension was prepared at a final concentration of $1\times10^8$ CFU/ml.

The bactericidal activity of 5 doses of the product was evaluated. For each phytopathogen, different concentrations were tested depending on the results previously obtained in the evaluation of antimicrobial activity (example 2).

TABLE 4

Concentrations used in the bactericidal activity test by contact test, selected from the antibacterial activity test (MIC).

| Phytopathogenic bacteria | MIC (µl/ml) | Concentrations for the contact test (µl/ml) |
|---|---|---|
| E. amylovora | 60-120 | 120, 60, 40, 20 and 10 |
| X. arboricola pv. pruni | 10-30 | 40, 30, 15, 7.5 and 3.75 |
| P. syringae pv. actinidiae | 10-30 | 40, 30, 15, 7.5 and 3.75 |
| P. syringae pv. tomato | 30-60 | 60, 40, 30, 15 and 7.5 |
| X. Axonopodis pv. vesicatoria | 10-30 | 40, 30, 15, 7.5 and 3.75 |

In addition, the effect of the product was compared with that of the antibiotic streptomycin at a concentration of 100 mg/L. An untreated control was also added, where the product was replaced by sterile distilled water.

The determination of the bactericidal activity of the different concentrations against the different phytopathogenic bacteria was carried out by means of a contact test with a suspension of the bacteria in liquid medium. The contact test consisted of mixing 100 µL of each treatment with 100 µL of the bacterial suspension at a concentration of $10^8$ CFU/ml obtaining a final volume of 200 µL in each well of the plaque (bacterial suspension at a final concentration of $5\times10^8$ CFU/ml). Both the different doses of the product and the streptomycin had been prepared twice concentrated (2×) to obtain the desired final concentration in each well.

The multiwell plates were incubated at 28° C. in constant agitation (150 rpm). At 30 minutes (min) and 2 hours (h) of exposure of the bacteria with the products, their survival was analyzed by counting viable in plaque. The colony-forming units (CFUs) were counted at 48 h after incubation at 28° C. determining the survival (CFU/ml) of each phytopathogenic bacterium for each treatment, and were compared with those obtained in the untreated control. Three repetitions were analyzed for each treatment.

From the survival (CFU/ml) obtained in each treatment, the minimum bactericidal concentration (MBC) and the dose that is lethal for half of a bacterial population (LD50) were determined. MBC was determined to be the lowest product concentration at which no bacterial growth is observed at the end of the experiment after incubation with the product. For the calculation of the LD50, the survival data as a function of concentration were transformed by the probit function, adjusted to a line and interpolation was performed to obtain the concentration in which only half of the initial bacterial population is observed.

The bactericidal activity of the different concentrations of the product against *E. amylovora, X. arboricola* pv. *pruni, X. axonopodis* pv. *vesicatoria, P. syringae* pv. *actinidiae* and *P. syringae* pv. *tomato* was evaluated by a contact test, where a suspension of each bacterium was incubated with each concentration of the product and samples were taken after 30 and 120 min. From the preparation of serial dilutions of each suspension and subsequent seeding in LB agar plates incubated at 28° C. for 48 h, we proceeded to the count of viable growable (surviving colonies).

Generally speaking, the observed bactericidal activity depended on the product concentration, the time of exposure and the pathogen used. The bactericidal activity of the product was increased by increasing the concentration and time of contact with the pathogen.

The following is the bactericidal effect of the different doses of the product against the phytopathogens tested:

*Erwinia amylovora*

FIG. 1 shows the survival of *E. amylovora* against product concentrations and contact time. No growth of Ea was observed after contact with the product EGL2 EC at the five doses evaluated, in either of the two times tested (30 min and 2 h). Survival in the untreated control was 100%.

A significant reduction in the survival of *E. amylovora* was observed after 30 min and 2 h of contact with the reference antibiotic at a concentration of 100 mg/L.

At 30 min of exposure, the lowest tested concentration of the product (10 μl/ml, 100% mortality) had higher bactericidal activity than the reference antibiotic streptomycin.

*Xanthomonas arboricola* pv. *pruni*

Figure 2:
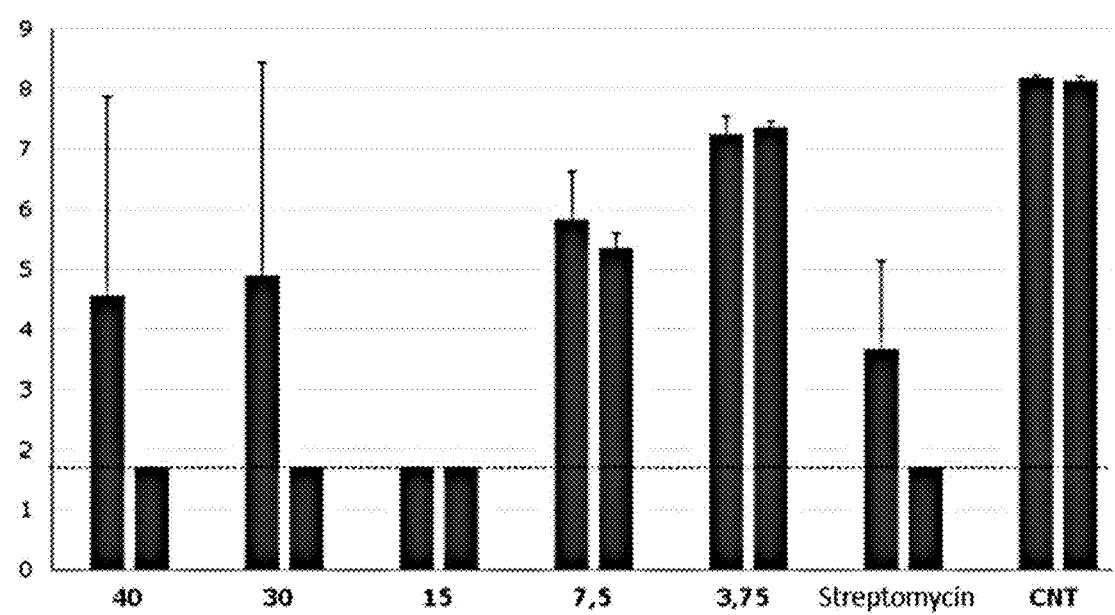
FIG. 2. Survival of *X. arboricola* pv. *pruni* depending on the treatment applied after 30 min (left bar) and 2 h (right bar) of contact with the product. The ordinate axis shows survival in Log CFU/ml and the abscissa axis shows product concentration in µl/ml, streptomycin (100 mg/L) and control (CNT). The bars represent the average of the values observed in the three repetitions performed for each treatment and time. The error bars show the confidence interval taking into account the standard deviation. (---), limit of detection of the technique.

FIG. 2 shows the graph of the survival of *X. arboricola* pv. *pruni* as a function of the treatment applied and the contact time studied. At 30 min of contact with the product, no survival of *X. arboricola* pv. *pruni* at the dose of 15 μl/ml is observed. However, at 30 minutes of contact with doses of 30 or 40 μl/ml, an average bacterial survival of 7.8 and 20.01% is observed, although these results present a high variability between replicates (FIG. 2). At 2 hours of contact with the product at concentrations of 40, 30 and 15 μl/ml no growth of *X. arboricola* pv *pruni* was observed.

At concentrations of 7.5 and 3.75 μl/ml, no significant differences were observed in the survival of *X. arboricola* pv. *pruni* as a function of contact time. In both cases, a significant reduction in the survival of the bacterium was observed with respect to the untreated control (survivals of 13.06% for the dose of 3.75 μl/ml; 0.99% for the dose of 7.5 μl/ml; 100% in the untreated control).

At 30 minutes of exposure to streptomycin, a mean survival of 0.01% was quantified, with high variability observed between the three replicates. However, at 2 hours of exposure no survival of *X. arboricola* pv. *pruni* was observed in any of the replicates.

*Xanthomonas axonopodis* pv. *vesicatoria*

Figure 3:
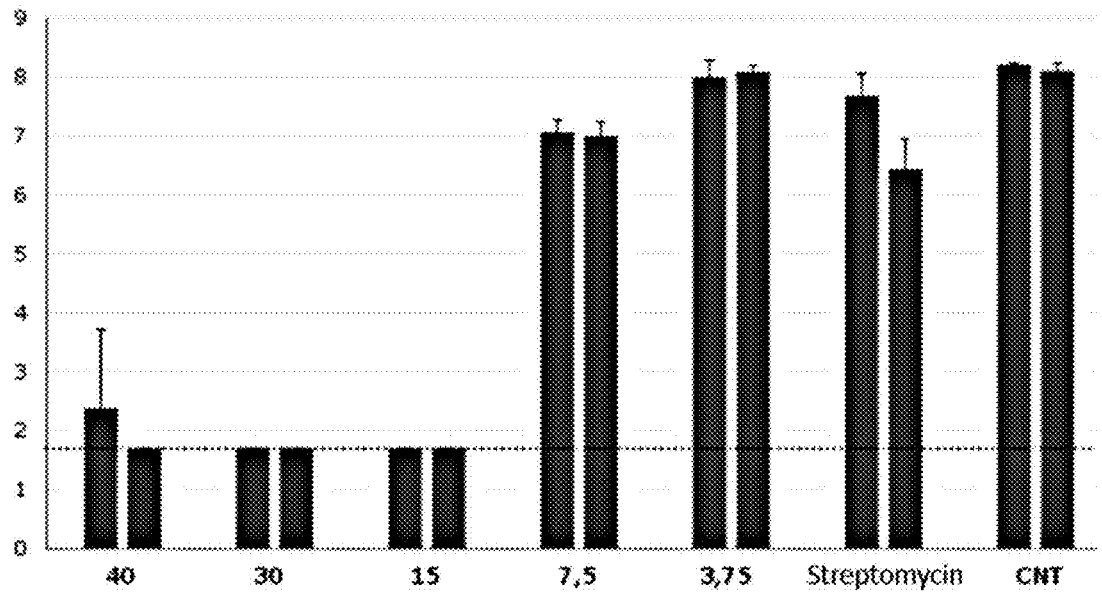
FIG. 3. Survival of *X. axonopodis* pv. *vesicatoria* depending on the treatment applied after 30 min (left bar) and 2 h (right bar) of contact with the product. The ordinate axis shows survival in Log CFU/ml and the abscissa axis shows product concentration in µl/ml, streptomycin (100 mg/L) and control (CNT). The bars represent the average of the values observed in the three repetitions performed for each treatment and time. The error bars show the confidence interval taking into account the standard deviation. (---), limit of detection of the technique.

FIG. 3 shows the survival of *X. axonopodis* pv. *vesicatoria* depending on the treatment and contact time studied.

At 30 min and 2 hours of contact with the product, no bacterial growth was observed at concentrations of 15, 30 or 40 μl/ml, presenting greater bactericidal activity than the antibiotic streptomycin. In the concentrations of 7.5 and 3.75 μl/ml no significant differences were observed between the two times tested and only a reduction in the survival of the bacterium was observed with respect to the untreated control at the concentration of 7.5 μl/ml. Specifically, at 7.5 μl/ml survival values similar to those obtained with the antibiotic streptomycin were observed (survival at 2 h of 8.2% of product 7.5 μl/ml; survival of 3.06 for 100 mg/L streptomycin).

*Pseudomonas syringae* pv. *actinidiae*

Figure 4:
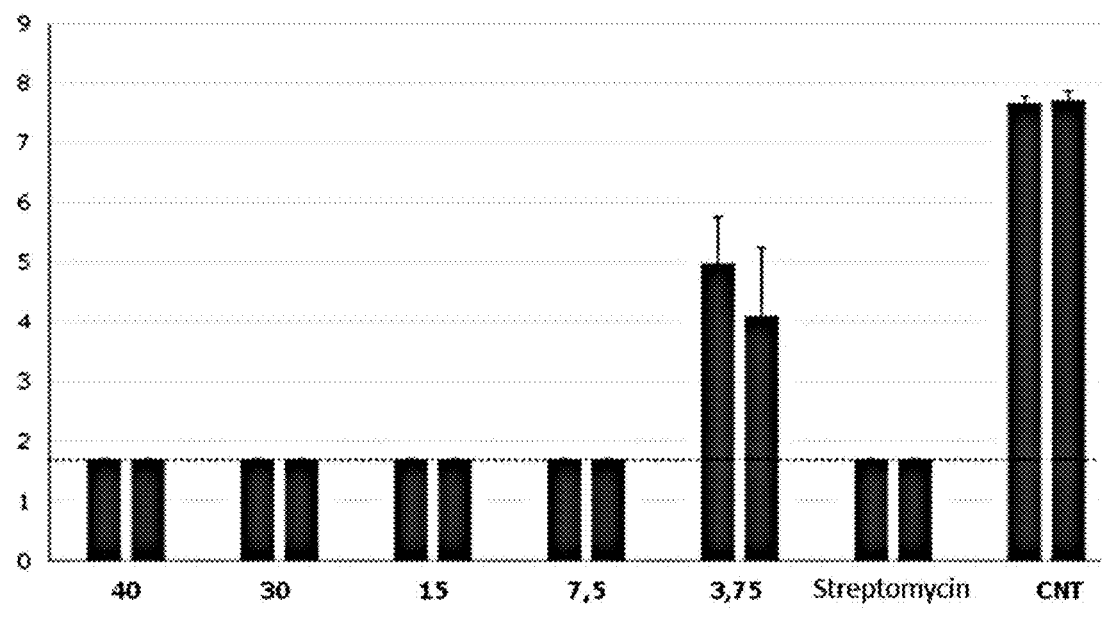
FIG. 4. Survival of *P. syringae* pv. *actinidiae* depending on the treatment applied after 30 min (left bar) and 2 h (right bar) of contact with the product. The ordinate axis shows survival in Log CFU/ml and the abscissa axis shows product concentration in µl/ml, streptomycin (100 mg/L) and control (CNT). The bars represent the average of the values observed in the three repetitions performed for each treatment and time. The error bars show the confidence interval taking into account the standard deviation. (---), limit of detection of the technique.

FIG. 4 shows the survival of *P. syringae* pv. *actinidiae* depending on the treatment and contact time studied.

In the concentrations of 40, 30, 15 and 7.5 μl/ml of the product and streptomycin, no growth of the bacterium was observed in either of the two times tested. Although survival of *P. syringae* pv. *actinidiae* at 3.75 μl/ml was observed at 30 min and 2 hours (0.1% survival), a significant reduction in growth was observed compared to the untreated control (100% survival).

*Pseudomonas syringae* pv. *tomato*

Figure 5:
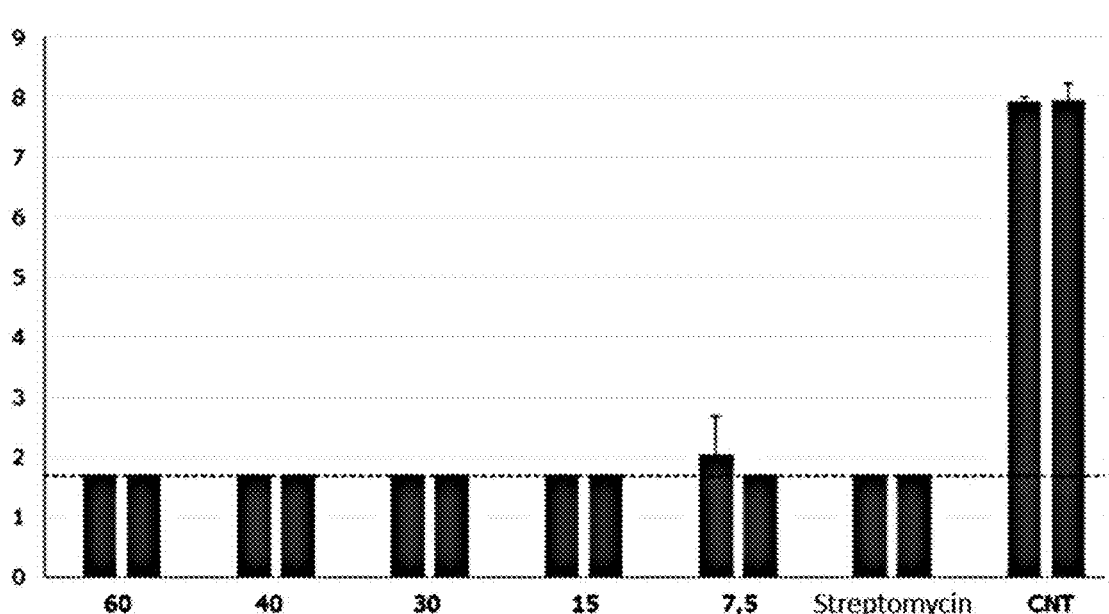
FIG. 5. Survival of *P. syringae* pv. *tomato* depending on the treatment applied after 30 min (bar on the left) and 2 h (bar on the right) of contact with the product. The ordinate axis shows survival in Log CFU/ml and the abscissa axis shows product concentration in µl/ml, streptomycin (100 mg/L) and control (CNT). The bars represent the average of the values observed in the three repetitions performed for each treatment and time. The error bars show the confidence interval taking into account the standard deviation. (---), limit of detection of the technique.

FIG. 5 shows the survival of *P. syringae* pv. *tomato* depending on the treatment and contact time studied.

In the concentrations of 60, 40, 30, 15 μl/ml of the product and streptomycin no growth of the bacterium was observed in either of the two times tested. At 30 min, only a survival of 0.0002 of the phytopathogen was observed in the lowest concentration of the product tested (7.5 μl/ml), and only in one of the three replicates, respect for untreated control. At 2 hours, no growth was observed in any of the tested concentrations or in the antibiotic streptomycin, compared to the untreated control.

The product showed different bactericidal activity compared to the five phytopathogenic bacteria tested: *E. amylovora* presented CMB values below 10 μl/ml, the lowest concentration tested for this pathogen, both at 30 min and 2 h. The CMB of *P. syringae* pv. *actinidiae* would be between doses 3.75-7.5 μl/ml in the two times studied. The lowest doses tested showed rapid bactericidal activity of the product (at 30 minutes a mortality close to 100% was observed). For *P. syringae* pv. *tomato* the CMB would be between 7.5 and 15 μl/ml at 30 minutes of contact with the product, decreasing to values below 7.5 μl/ml after 2 h of contact. *X. arboricola* pv. *pruni* and *X. axonopodis* pv. *vesicatoria* presented a CMB greater than 40 μl/ml at 30 min, while at 2 h the CMB was between 3.75 and 7.5 μl/ml.

These results indicate that in the case of *P. syringae* pv. *tomato, X. arboricola* pv. *pruni* and *X. axonopodis* pv. *vesicatoria* it was necessary to have more contact time of the bacterial suspension with the product at the lowest concentrations tested to observe a mortality close to 100%.

The CMB values obtained are below the concentration of 15 μl/ml at 2 hours of contact with the product in the different phytopathogenic bacteria used.

TABLE 5

| | CMB (µl/ml) | | DL50 | |
|---|---|---|---|---|
| Pathogen | 30 min | 2 hours | 30 min | 2 hours |
| E. amylovora | <10 | <10 | nd | nd |
| X. arboricola pv. pruni | >40 | 7.5-15 | 2.73 | 2.78 |
| P. syringae pv. actinidiae | 3.75-7.5 | 3.75-7.5 | 0.55 | 0.93 |
| P. syringae pv. tomato | 7.5-15 | <7.5 | 0.00009 | nd |
| X. axonopodis pv. vesicatoria | >40 | 7.5-15 | 4.5 | 5.48 |

LD50 and CMB of the product against the different phytopathogens tested, expressed in µl/ml of product.

nd: LD50 could not be determined because in none of the dilutions tested was there any growth of the bacterium.

The median effective dose (LD50) of the product against *X. arboricola* pv. *pruni* was similar in the two times studied, 2.73 µl/ml at 30 min and 2.78 µl/ml at 2 h. While in *P. syringae* pv. *actinidiae* and *X. axonopodis* pv. *vesicatoria* varied slightly between the 2 times studied. The DL50 for *P. syringae* pv. *actinidiae* was 0.55 µl/ml at 30 min and 0.93 µl/ml at 2 h. And for *X. axonopodis* pv. *vesicatoria*, they were 4.5 µl/ml and 5.48 µl/ml. This variation can be attributed to the slight increase in CFU/ml in the CNT after 2 hours of incubation, and therefore in the rest of the treatments.

For *E. amylovora* and for *P. syringae* pv. *tomato* at 30 minutes and 2 hours it has not been possible to calculate the LD50 since no growth was observed in any of the concentrations of the product tested. For this, it would be necessary to evaluate the bactericidal effect of doses lower than those tested in this study.

Analyzing the values of CMB and DL50, it can be confirmed that the product presents a clear and rapid bactericidal activity against *E. amylovora, P. syringae* pv. *actinidiae, P. syringae* pv. *tomato, X. arboricola* pv. *pruni* and *X. axonopodis* pv. *vesicatoria.*

*P. syringae* pv. *actinidiae* and *P. syringae* pv. *tomato* turned out to be more sensitive to the product than *X. arboricola* pv. *pruni* and *X. axonopodis* pv. *vesicatoria*. It cannot be ruled out that *E. amylovora* is more sensitive than *P. syringae* pv. *actinidiae* or *P. syringae* pv. *tomato* because the lowest dose tested was 10 µl/ml.

In order to be able to determine exactly the MIC and LD50 of the product against phytopathogenic bacteria, it would be necessary to test more concentrations of the product within the observed MIC range.

Example 4: Evaluation of Bactericidal Activity Against Three Subspecies of *Xylella fastidiosa*

The product of the present invention was tested against three subspecies of *Xylella fastidiosa*. The product evaluated comprised eucalyptus oil in sufficient amount to comprise 20% w/v of 1,8-cineole (measured by HPLC) and was kept at room temperature until the time of use, when a sample quantity was taken that was used to perform microbiological analyses, and to confirm the absence of contaminating microorganisms.

The efficacy of the product was evaluated against three subspecies of *X. fastidiosa*: sbsp. *pauca* strain CoDiRO (DD1), which affects olive tree in Italy, subsp. *fastidiosa* and subsp. *multiplex* both from Spanish foci of infection (Balearic Islands and Alicante, respectively) and isolated from almond trees, deposited in the collection of quarantine pathogens of the CIDSAV. The inocula were obtained from the pure culture of the actively growing strains after seeding in BCYE agar medium and incubation at 28° C. for 7-10 days. Each bacterial suspension was prepared at a final concentration of $1\times10^8$ CFU/ml.

All the manipulations were carried out in the biosafety laboratory that is authorized for research with *X. fastidiosa* under in vitro conditions, by the DARP of the Generalitat de Catalunya.

The strains used in the bactericidal activity test were as follows:

| Phytopathogenic bacteria | Strain used | Origin |
|---|---|---|
| *Xylella fastidiosa* subsp. *fastidiosa* | IVIA 5387.2 | Balearic Islands |
| *Xylella fastidiosa* subsp. *Multiplex* | IVIA 5901.2 | Valencia |
| *Xylella fastidiosa* subsp. *Pauca* | DD1 CoDiRO | Italy |

The bactericidal activity of 5 doses of the product was evaluated against 3 subspecies of *X. fastidiosa*. Taking into account the results of Example 2, the concentrations of 0.75, 1.25, 2.5, 5 and 10 µl/ml of the product were tested. In addition, the effect of the product was compared with that of the antibiotics streptomycin and ampicillin at a concentration of 100 mg/L. An untreated control was also included, where the product was replaced by sterile distilled water.

The determination of the bactericidal activity of the different concentrations of the product against the phytopathogenic bacteria was carried out by means of a contact test with a suspension of the bacterium in liquid medium.

The contact test consisted of mixing 100 µL of each product/concentration with 100 µL of the bacterial suspension at a concentration of $10^8$ CFU/ml, obtaining a final volume of 200 µL in each well of the plaque (bacterial suspension at a final concentration of approximately $5\times10^7$ CFU/ml). Both the different doses of the product and the antibiotics had been prepared twice concentrated (2×) to obtain the desired final concentration in each well.

The multiwell plates were incubated at 28° C. in constant agitation (150 rpm). At 30 minutes (min) and 2 hours (h) of exposure of the bacteria with the products, samples were taken and their survival was analyzed by counting viable in plaque. The colony-forming units (CFUs) were counted at 7-10 days after incubation at 28° C. determining survival (CFU/ml), and were compared with those obtained in the untreated control. Three repetitions were analyzed for each treatment.

From the survival (CFU/ml) obtained in each treatment, the minimum bactericidal concentration (MBC) and the median lethal dose (LD50) were determined. MBC was determined to be the lowest product concentration at which no bacterial growth is observed at the end of the experiment after incubation with the product. For the calculation of the LD50, the survival data as a function of concentration were transformed by the probit function, adjusted to a line and interpolation was performed to obtain the concentration in which only half of the initial bacterial population is observed.

No growth of any of the three subspecies of *Xylella fastidiosa* was observed after contact with the product at the five doses evaluated, in either of the two times tested (30 min and 2 h). Survival in the untreated control was approximately 100%. The survival of *X. fastidiosa* after contact with the reference antibiotics depended on the subspecies studied, as well as the antibiotic tested.

The following is the bactericidal effect of the different doses of the product against the phytopathogens tested:

*X. Fastidiosa* Subsp. *Pauca* coDiRO Strain

Figure 6:
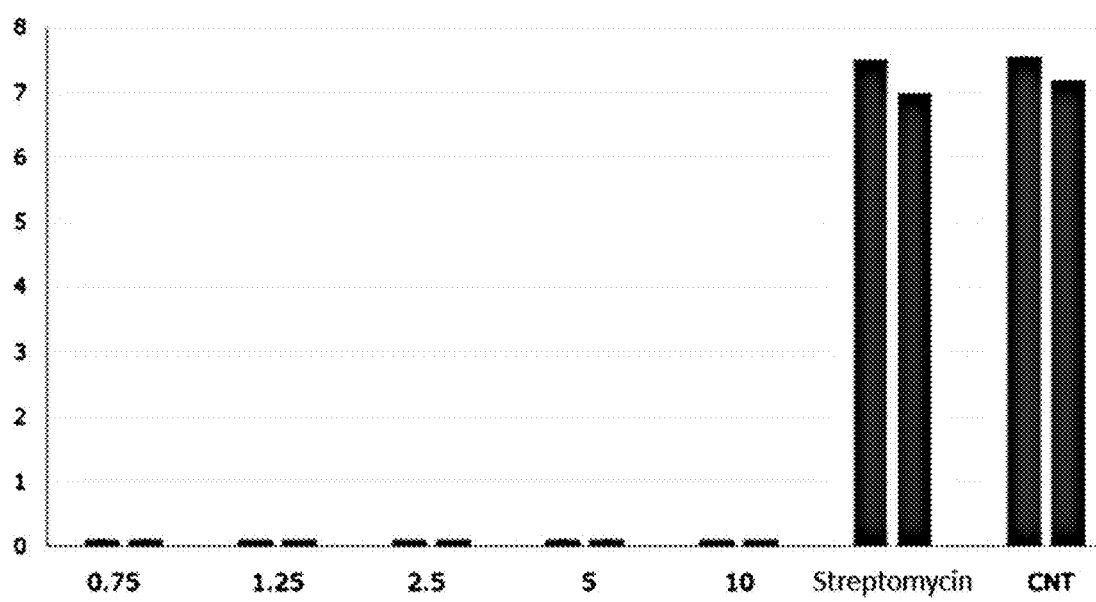
FIG. 6. Survival of *X. fastidiosa* subsp. *pauca* depending on the treatment applied after 30 min (left bar) and 2 h (right bar) of contact with the product. The ordinate axis shows survival in Log CFU/ml and the abscissa axis shows product concentration in µl/ml, streptomycin (100 mg/L) and control (CNT). The bars represent the average of the values observed in the three repetitions performed for each treatment and time.

The viable count was performed after 8 days of incubation at 28° C. in PD2 agar culture medium. In FIG. 6 the results are shown against the concentrations of the product and as a function of the contact time.

No growth of *X. fastidiosa* subsp. *pauca* after contact with the product at the five doses evaluated, in neither of the two times tested (30 min and 2 h). Survival in the untreated control was 100%.

Survival of 89.8% and 61.7% was observed after 30 and 120 minutes, respectively, of contact with the antibiotic streptomycin at a concentration of 100 mg/L. The bactericidal effect of ampicillin was not evaluated.

At 30 min of exposure, the lowest tested concentration of the product (0.75 µl/ml, mortality 100%), presented greater bactericidal activity than the reference antibiotic streptomycin.

the treatment and the contact time studied. At 30 min and 2 hours after contact with the product, no bacterial growth was observed at any of the tested doses of the product. Survival in the untreated control was 100%. At 30 and 120 minutes of streptomycin exposure, a mean survival of 4.4% and 20%, respectively, was quantified. At 30 and 120 minutes of exposure to the antibiotic ampicillin, no survival of *X. fastidiosa* subsp. *fastidiosa* in the direct suspension or dilution −1 (dilution 1/10 of the original suspension). However, when performing the serial dilutions −2 (1/100) and −3 (1/1000) a survival similar to that observed in the untreated control was obtained, at the same dilution. This bacterial growth is related to the fact that by diluting the bacterial suspension in contact with ampicillin and subsequently seeding in agar medium plates in the absence of the antibiotic, the antibiotic is also diluted 1/100 and 1/1000 so that it ceases to have effect. In this case, ampicillin would have a bacteriostatic effect on the *fastidiosa* subspecies. Unlike the test in example 1, where antibacterial activity was evaluated using the Agar Incorporation Test, the antibiotic is in continuous contact with the bacterial suspension, in a contact test only the antibiotic remains in direct contact with the bacterial suspension during the selected exposure time.

At 30 min of exposure, the lowest tested concentration of the product (0.75 µl/ml, mortality 100%), presented greater bactericidal activity than the reference antibiotics ampicillin and streptomycin.

The product presented a rapid bactericidal activity against the three subspecies of *Xylella fastidiosa* tested (at 30 minutes a mortality close to 100% was observed, Table 5). The CMB values obtained are below the concentration of 0.75 µl/ml at 30 and 120 minutes of contact with the product.

TABLE 6

LD50 and CMB of the product against the different phytopathogens tested, expressed in µl/ml of product.

| | CMB (µl/ml) | | DL50 | |
|---|---|---|---|---|
| Pathogen | 30 min | 2 hours | 30 min | 2 hours |
| *Xylella fastidiosa* subsp. *Pauca* | <0.75 | <0.75 | nd | nd |
| *Xylella fastidiosa* subsp. *multiplex* | <0.75 | <0.75 | nd | nd |
| *Xylella fastidiosa* subsp. *fastidiosa* | <0.75 | <0.75 | nd | nd | nd: the LD50 could not be determined exactly because in none of the dilutions tested was the growth of the bacterium obtained.

*Xylella fastidiosa* Subsp. *multiplex*

Figure 7:
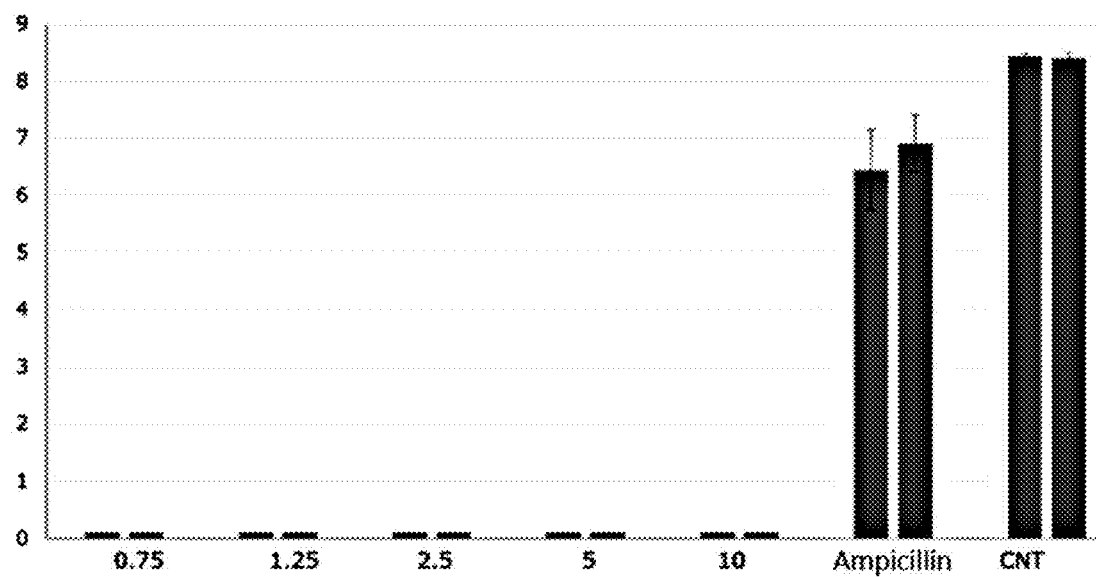
FIG. 7. Survival of *Xylella fastidiosa* subsp. *multiplex* depending on the treatment applied after 30 min (left bar) and 2 h (right bar) of contact with the product. The ordinate axis shows survival in Log CFU/ml and the abscissa axis shows the concentration of the product in µl/ml, ampicillin (100 mg/L) and control (CNT). The bars represent the average of the values observed in the three repetitions performed for each treatment and time. The error bars show the confidence interval taking into account the standard deviation.

The viable count was performed after 8 days of incubation at 28° C. in BCYE agar culture medium. FIG. 7 shows the survival graph of *Xylella fastidiosa* subsp. *multiplex* depending on the treatment applied and the contact time studied.

No growth of *X. fastidiosa* subsp. *multiplex* after contact with the product at the five doses evaluated, in neither of the two times tested (30 min and 2 h). Survival in the untreated control was 100%.

At 30 and 120 minutes of exposure to ampicillin, a mean survival of 2% and 4.4%, respectively, was quantified. After contact with the antibiotic streptomycin, no significant differences were observed in the survival of *Xylella fastidiosa* compared to the untreated control.

At 30 min of exposure, the lowest tested concentration of the product (0.75 µl/ml, 100% mortality) showed greater bactericidal activity than the reference antibiotic, ampicillin.

*Xylella fastidiosa* Subsp. *fastidiosa*

Figure 8:
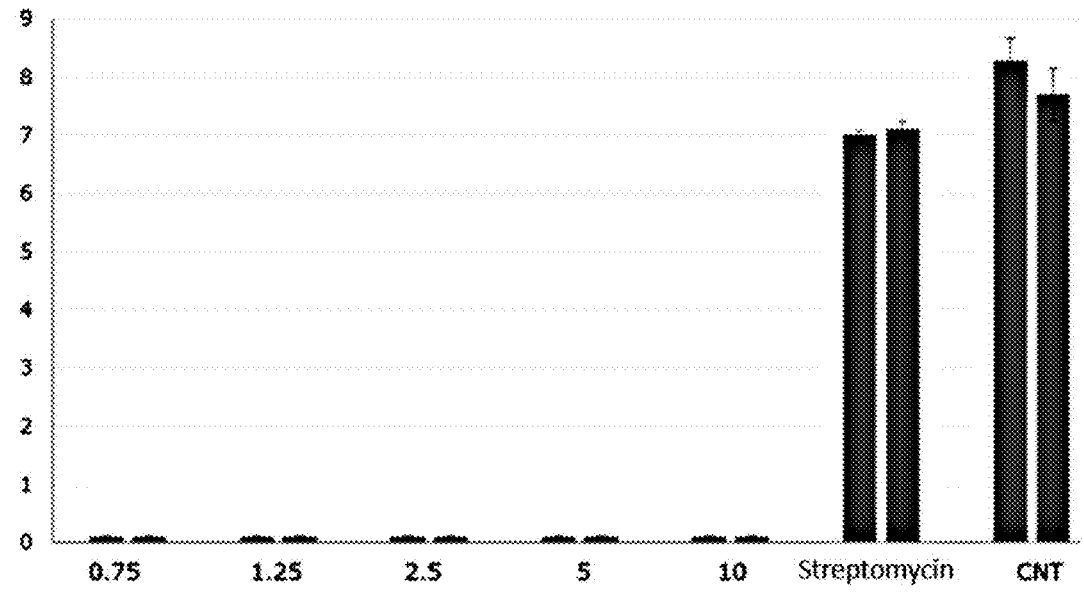
FIG. 8. Survival of *Xylella fastidiosa* subsp. *fastidiosa* depending on the treatment applied after 30 min (left bar) and 2 h (right bar) of contact with the product. The ordinate axis shows survival in Log CFU/ml and the abscissa axis shows product concentration in µl/ml, streptomycin (100 mg/L) and control (CNT). The bars represent the average of the values observed in the three repetitions performed for each treatment and time. The error bars show the confidence interval taking into account the standard deviation.

The viable count was performed after 8 days of incubation at 28° C. in PD2 agar culture medium. FIG. 8 shows the survival of *Xylella fastidiosa* subsp. *fastidiosa* depending on Analyzing the CMB values, it can be confirmed that the product presents an intense and rapid bactericidal activity against *Xylella fastidiosa*. In order to determine exactly the MIC and quantify the LD50 of the product against the three subspecies of *X. fastidiosa* it would be necessary to test more concentrations of the product below 0.75 µl/ml.

Example 5: Evaluation of the Efficacy of the Control of *Erwinia amylovora* in Pear Trees The compositions of the present invention were tested in the control of *Erwinia amylovora* in pear tree. The tested product comprised eucalyptus oil in sufficient amount for the composition to have 20% w/v of 1,8-cineole and was preserved at room temperature.

The EPS101 strain of *E. amylovora*, isolated from an infected outbreak of Conference pear tree from Lleida, and preserved deep-frozen, was used. The inoculum was obtained from the pure culture of the actively growing strain after seeding in LB agar medium and incubation at 28° C. for 24 hours. The bacterial suspension was prepared at a final concentration of 5×10$^7$ CFU/ml.

For this trial, pear plants of the Conference variety from self-rooted plants of 3 years of age were used. The plants were fertilized once a week with a 200 ppm solution of NPK (20:10:20) and used when the shoots contained 5 to 6 young leaves per shoot. During the process, standard treatments with insecticides and acaricides were carried out. No fungicides or bactericides were applied to avoid interference in the test.

The efficacy of 2 doses of las compositions of the invention in the control of *Erwinia amylovora* in pear tree was evaluated. The doses tested were 40 and 20 µl/ml. In addition, the effect of the product was compared with that of the antibiotic streptomycin at a concentration of 100 mg/L. An untreated control was also included, where the product was replaced by sterile distilled water.

The experimental design consisted of 3 repetitions of 3 plants per treatment, with a minimum of two tender shoots per plant (most had more than 3 tender shoots). The trial was conducted twice independently.

The tests were carried out in a biosafety greenhouse under appropriate containment measures according to the protocols established by the European and Mediterranean Organization for the Protection of Plants (EMOPO) for quarantine phytopathogens. The greenhouse conditions of temperature, relative humidity and light cycles were completely controlled.

Before treating the plants and in order to facilitate the entry of the pathogen, 2 parallel cuts of 2 mm in length were made 1 mm apart and perpendicular to the central nerve, in the 3 youngest leaves of each shoot, since these are the most susceptible to infection.

The treatments were carried out by foliar spraying applying a minimum of 10 ml per plant, ensuring the impregnation of the entire leaf surface.

After the treatments, the EPS101 strain of *E. amylovora* was inoculated, which was carried out by applying 10 µl of a bacterial suspension at $5 \times 10^7$ CFU/ml on each of the previously performed wounds. Once inoculated they were bagged to maintain a high relative humidity, necessary for the development of the disease and incubated for 8 days at $25 \pm 2°$ C. and 16 hours of light and at $20 \pm 2°$ C. and 8 hours of darkness. Disease levels were determined at 8 days after inoculation of the pathogen by assigning an infection intensity index with values from 0 to 4, depending on the progression of the syndromes: 0, without necrosis; 1, necrosis located around the wound; 2, total necrosis of the central nerve; 3, progression of necrosis through the petiole; and 4, progression of necrosis to the shoot.

The severity of infections in each of the treatments was calculated according to the following formula:

$$S = \sum_{i=1}^{n} \frac{Ii}{n}$$

where S is the severity of recurrent infection, I is the index of severity of infection, n is the number of inoculated leaves.

Once the severity in each response for each treatment was obtained, the existence of significant differences was determined by ANOVA and the separation of means was performed with the Waller-Duncan test using the SPSS statistical package (IBM SPSS Statistics v25).

Figure 9:
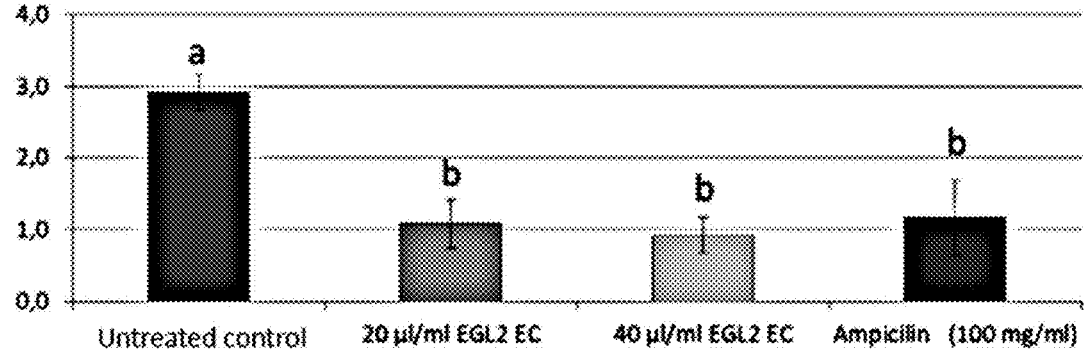
FIG. 9. Effect of treatment with the product on the severity of infections caused by *E. amylovora* in pear plants of the Conference variety, inoculated with a suspension of $5 \times 10^7$ cfu/ml of *E. amylovora*. The bars correspond to the average of the three repetitions for each treatment. The error bars represent the confidence interval taking into account the standard deviation. Different letters indicate the existence of significant differences with respect to the witness according to the Waller-Duncan test. These results correspond to the first trial (A) and the second trial (B). EGL2 EC is a product of the invention and comprises an amount of eucalyptus oil necessary for the product to have 20% w/v of 1,8-cineole, at least one diluent, at least one surfactant, at least one anti-oxidant and at least one viscosizer.

FIG. 9 shows the results corresponding to the severity of infections observed in the two efficacy trials of the product in the control of *E. amylovora* in pear plants.

In the first trial it was observed that the two doses of the product and streptomycin significantly reduced the severity of infections with respect to untreated control. No significant differences were observed between the two doses studied. Streptomycin at a dose of 100 mg/L was the most effective treatment.

In the second trial, the severity levels of infections caused by *E. amylovora* were higher than those observed in the first trial. The two doses of the product and streptomycin also significantly reduced the severity of infections with respect to untreated control. Unlike the first trial, no significant differences were observed between the doses of 20 and 40 µl/ml of the product and streptomycin.

The product was 30 to 62% effective in controlling *E. amylovora* in pear plants, depending on the dose and the trial. Specifically, the dose of 20 µl/ml was 37% effective in the first trial and 36% in the second. And the dose of 40 µl/ml presented 62% and 30%, respectively.

Example 6: In-Plant Evaluation of the Efficacy of the Product in the Control of *Xylella fastidiosa*

The efficacy of the product was evaluated against *Xylella fastidiosa* subsp. *fastidiosa* from Spanish (Balearic Islands) outbreaks of infection and isolated from almond trees, deposited in the CIDSAV collection of quarantine pathogens. The tested product comprised eucalyptus oil in sufficient amount to have 20% w/v of 1,8-cineole (quantified by HPLC) and was stored at room temperature.

The inoculum was obtained from the pure culture of the actively growing strain after seeding in BCYE agar medium and incubation at $28°$ C. for 7-10 days. The bacterial suspension was prepared at a final concentration of $1 \times 10^8$ CFU/ml. The product was kept at room temperature until the time of use.

The pathogen was inoculated by microinjection applied to the trunk. 27 days after inoculation the plants are treated with the product by microinjection applied to the trunk, in curative strategy (after inoculation of the pathogen), and a single application. Two doses of the product were tested, and the antibiotic ampicillin was used as a reference product. In addition, an untreated control (water instead of product) was included.

Total population levels were quantified using conventional qPCR and viable cells using viable-qPCR.

Almond plants of the Avijor variety were used, and kept in pot in the greenhouse, using standard growing conditions. 40 plants (10 per treatment) are inoculated with a bacterial suspension of strain 5387.2 (three inoculation points in a 4-5 cm section). During the following days, the presence of *Xylella fastidiosa* in the conductive vessels was tested, and if it was alive and if it ascended through the vascular tissue (by means of viable qPCR). The inoculation zone and the apical zone (away from the inoculation point) were analyzed by qPCR at 7, 15 and 27 dpi (viable qPCR). At 27 days, the presence of live *Xylella fastidiosa* in vascular tissue was confirmed. On the same day, the different treatments are applied (doses of 20 µl/ml and 40 µl/ml, Ampicillin 100 mg/L, Water). During the application of the product (three inoculation points in a section of 4-5 cm. 10 µl per point) it is observed that it is absorbed with difficulty, probably due to its composition. Therefore, after application, the plants are kept in a horizontal position for 18 h, in order to increase the absorption of the product by the plant.

31 days after the application of the different treatments (dpt) symptoms were observed in the leaves that could be attributed to the typical symptoms associated with diseases caused by *Xylella fastidiosa* in almond trees. The intensity of the symptoms increased over time, with a greater severity of the disease observed in the control plants. Disease levels were determined at 31 days after application of the product (in curative strategy) by assigning an infection intensity index with values from 0 to 5, depending on the progression of the symptoms: 0, without necrosis; 1, one or two leaves showing marginal necrosis; 2, two or three leaves showing marginal necrosis; 3, half or more of the leaves show necrosis; 4, all leaves show necrosis and 5, all leaves and stem show necrosis.

Figure 10:
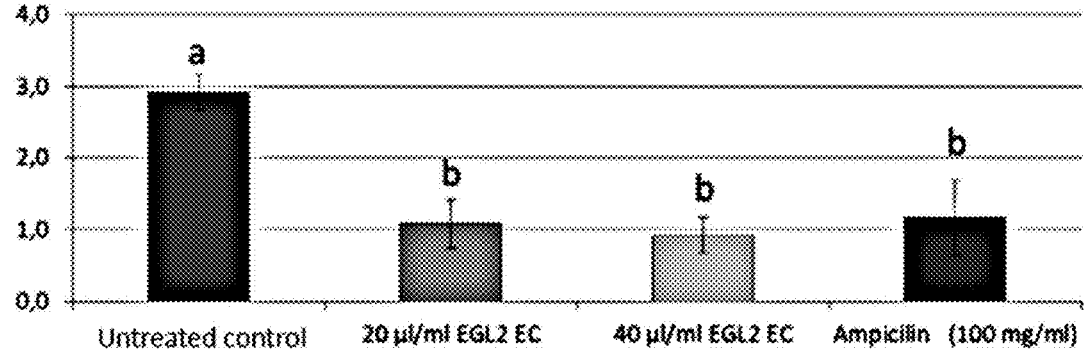
FIG. 10. Effect of treatment with the product on the severity of infections caused by *Xylella fastidiosa* subsp. *fastidiosa* in almond plants. The bars correspond to the average of the three repetitions for each treatment. The error bars represent the confidence interval taking into account the standard deviation. Different letters indicate the existence of significant differences with respect to the witness according to the Waller-Duncan test. EGL2 EC is a product of the invention and comprises an amount of eucalyptus oil necessary for the product to have 20% w/v of 1,8-cineole, at least one diluent, at least one surfactant, at least one anti-oxidant and at least one viscosizer.

FIG. 10 shows the results corresponding to the severity of infections observed in the efficacy trial of the product in the control of *Xylella fastidiosa* subsp. *fastidiosa* in almond plants. It was observed that the two tested doses of the product and ampicillin significantly reduced the severity of infections with respect to untreated control. No significant differences were observed between the two doses studied or treatment with ampicillin (100 mg/L).

18 hours after the application of the different treatments, a savia extraction is carried out from the area near the inoculation point and from the apical zone of the plant (8 cm from each area). In some control plants no sap was obtained, most likely due to necrosis caused by sap obstruction resulting from the formation of the biofilm of *Xylella fastidiosa*. When tissue necrosis exists, bacteria are not usually detected by PCR or qPCR. In addition, most of the cells that are part of the biofilm are dead (which leads to DNA degradation). This added to the fact that the cells in biofilm are difficult to extract, does not allow to obtain real results of the quantification/detection of *Xylella fastidiosa* by qPCR/viable-qPCR (usually the ND result is obtained, not detected).

After the application of the product at 40 µl/ml, a decrease in viable bacteria was observed in the vascular tissue of the apical zone, in 75% of the plants analyzed (the number of total cells, i.e. viable, and dead, was higher than the number of viable cells detected by viable-qPCR). That is, it can be associated with a bactericidal activity of the product 18 h after its application. With the rest of the treatments, a decrease in the viability of *Xylella fastidiosa* is observed in only 1 of the 4 plants analyzed (25%).

The analysis of the savia 18 hours dpt with a testing of 4 plants per treatment revealed that the treatment with the dose of 20 µl/ml caused the decrease of viable in the apical zone of 25% of the plants (analyzed by viable-qPCR), while the treatment with the dose of 40 µl/ml caused the decrease of viable in the apical zone of 75% of the plants. Treatment with ampicillin (100 mg/L) caused the decrease of viable at the inoculation point of 25% of the plants and the untreated controls showed a decrease of viable in the apical zone of 25% of the plants.

14 days after the application of the product, apical leaves but close to the point of inoculation and leaves of the apical zone were analyzed (in this case we do not analyze xylem, because it is a destructive method, and we would reduce the number of plants that we would have left to analyze at the end of the experiment). By qPCR we observed a lower progression of *Xylella fastidiosa* by the vascular system (movement from the point of inoculation to the apical area of the plant) of plants treated curatively with 40 µl/ml of product, compared to the untreated control. This effect is not observed after treatment with 20 µl/ml of product or with the reference antibiotic ampicillin (100 mg/L).

In order to study the progression of *Xylella fastidiosa* through the conductive vessels, 31 days after the application of the different treatments, a sap extraction was carried out from three different areas of the plant (8 cm from each area). Samples are analyzed using conventional qPCR (total cells).

Apical zone 1 (A1): Area above the point of application of the product.

Apical Zone 2 (A2): Area closest to the apical meristem of the stem.

Basal zone (B): The area located between the point of inoculation and the beginning of the root system.

In the same way as with the 1 dpt analysis, it is observed how the volume of sap extracted from the control plants after 31 days of treatment (and some of the plants treated with ampicillin) is much lower than the rest of the treatments. In addition, it can be related to the greater necrosis observed in the stems of control plants, related to the greater severity of the disease observed (at 31 dpt), compared to the rest of the treatments.

With the dose of 20 µl/ml no downward movement of *Xylella fastidiosa* is observed from the apical zones to the basal zone in none of the plants analyzed. *Xylella fastidiosa* is also not detected in A1 in 25% of plants. *Xylella fastidiosa* in A2 is also not detected in 25% of plants *Xylella fastidiosa* in B is not detected in 100% of plants.

With the dose of 40 µl/ml no, upward movement of *Xylella fastidiosa* is observed from apical zone 1 to apical zone 2 in none of the plants analyzed. Only progression of *Xylella fastidiosa* to the basal zone is observed in 25% of plants. *Xylella fastidiosa* in A1 is not detected in 25% of plants. *Xylella fastidiosa* in A2 is not detected in 100% of plants *Xylella fastidiosa* in B is not detected in 75% of plants.

With treatment with ampicillin se observes upward movement (apical zones) and descendant (basal zone) of *Xylella fastidiosa* in 75% of the plants analyzed *Xylella fastidiosa* is not detected in A1 in 25% of plants *Xylella fastidiosa* in A2 is not detected in 25% of plants *Xylella fastidiosa* is not detected *Xylella fastidiosa* in B in 25% of plants.

In untreated controls, necrosis and/or biofilm are observed on the stem, especially in the stem corresponding to the apical areas.

After treatment with the dose of 40 µl/ml, *Xylella fastidiosa* is detected in 75% of plants in apical zone 1. However, in 100% of the plants analyzed, *Xylella fastidiosa* is not observed in the apical zone 2. In addition, *Xylella fastidiosa* is not detected in the basal zone of 75% of the plants analyzed. This fact implies that there is no movement of *Xylella fastidiosa* from the Apical zone 1 to the rest of the plant zones (Apical 2 and basal). After treatment with the dose of 20 µl/ml no movement of *Xylella fastidiosa* is observed from the apical zones to the basal zone of the plants. On the contrary, after treatment with the reference antibiotic ampicillin at a dose of 100 mg/L, upward and downward movement of *Xylella fastidiosa* is observed throughout the vascular system in 75% of the plants analyzed.

Example 7: In Planta Evaluation of the Efficacy of the Product in the Control of Two Strains of Three Subspecies of *Xylella fastidiosa*

The efficacy of the product was evaluated against two subspecies of *X. fastidiosa* subsp. *fastidiosa* strain IVIA 5387.2 and subsp. *multiplex* strain IVIA 5901.2 both from Spanish foci of infection (Balearic Islands and Alicante, respectively) and isolated from almond trees.

The inocula were obtained from a pure culture of these strains in active growth after seeding in BCYE agar and incubation at 28° C. for 7-10 days. Each bacterial suspension was prepared at a final concentration of $1\times10^8$ CFU/ml. The pathogen was inoculated by microinjection applied to the trunk, performing a total of 3 applications of 10 μl each (three inoculation points in a section of 4-5 cm, $3\times10^6$ total CFUs), corresponding to 1.2 μl of the product. In addition, the effect of the product was compared with that of the antibiotic ampicillin at a concentration of 100 mg/l. An untreated control was also added, where the product was replaced by sterile distilled water. Precision injection equipment was used. The tested product comprised eucalyptus oil in sufficient amount to have 20% w/v of 1,8-cineole (quantified by HPLC) and was preserved at room temperature.

The effect of the product on the control of *X. fastidiosa* subsp. *multiplex* 5901 and *X. fastidiosa* subsp. *fastidiosa* 5387 was evaluated on almond plants of the Avijor variety, which were kept in pot in the greenhouse, using standard growing conditions. The plants were fertilized once a week with a solution of 200 ppm of NPK (20:10:20). During the process, standard treatments with insecticides and acaricides were carried out. The use of fungicides and bactericides was avoided to exclude interference in the development of the assay.

Curative application of the products by microinjection into the trunk significantly reduced the severity of infections caused by both strains (subsp. *fastidiosa* strain 5387, subsp. *multiplex* strain 5901) in almond plants, with respect to the untreated control. The product showed an efficacy of 52-68% in the control of *X. fastidosa* in almond trees, with respect to the untreated control. The product at 4% v/v (40 μl/ml) has bactericidal activity against *Xylella fastidosa,* 18 h after application by microinjection into the trunk. By means of viable qPCR, a decrease in viable cells in the vascular tissue of the apical area of the plant is confirmed, with respect to the untreated control. Curative application of the product at 4% v/v (40 μl/ml) decreases the spread of *Xylella fastidiosa* subsp. *fastidiosa* strain 5387 at 14 and 31 days after treatment.

Additionally, when the trials in the almond plants were completed (4-6 months after inoculation, 3-5 months after the application of the treatments), the product was applied curatively by irrigation at 4% v/v (at 6 and 4 months after inoculation of pathogens *X. fastidiosa* subsp. *fastidiosa* 5387 and *X. fastidiosa* subsp. *multiplex* 5901, respectively). 75% of the plants treated with the product showed lower levels of *Xylella fastidiosa* than those observed in infected but untreated plants, and for both subspecies of *Xylella fastidiosa*. In addition, in the case of almond trees—*X. fastidiosa* subsp. *fastidiosa*, this decrease in the *Xylella* population was observed both in the trunk (without sap) and in previously extracted sap. At 5 dpt, a clear antibacterial effect of the product is observed against both subspecies of *Xylella*, when applied by irrigation, compared to untreated control plants. A clear antibacterial effect of the product is observed against *multiplex* and *fastidiosa* subspecies, after its curative application by irrigation, on infected plants and with a very high rate of severity of the disease, compared to untreated control plants.

Example 8: Evaluation of Bactericidal Activity by Contact Test

Figure 11:
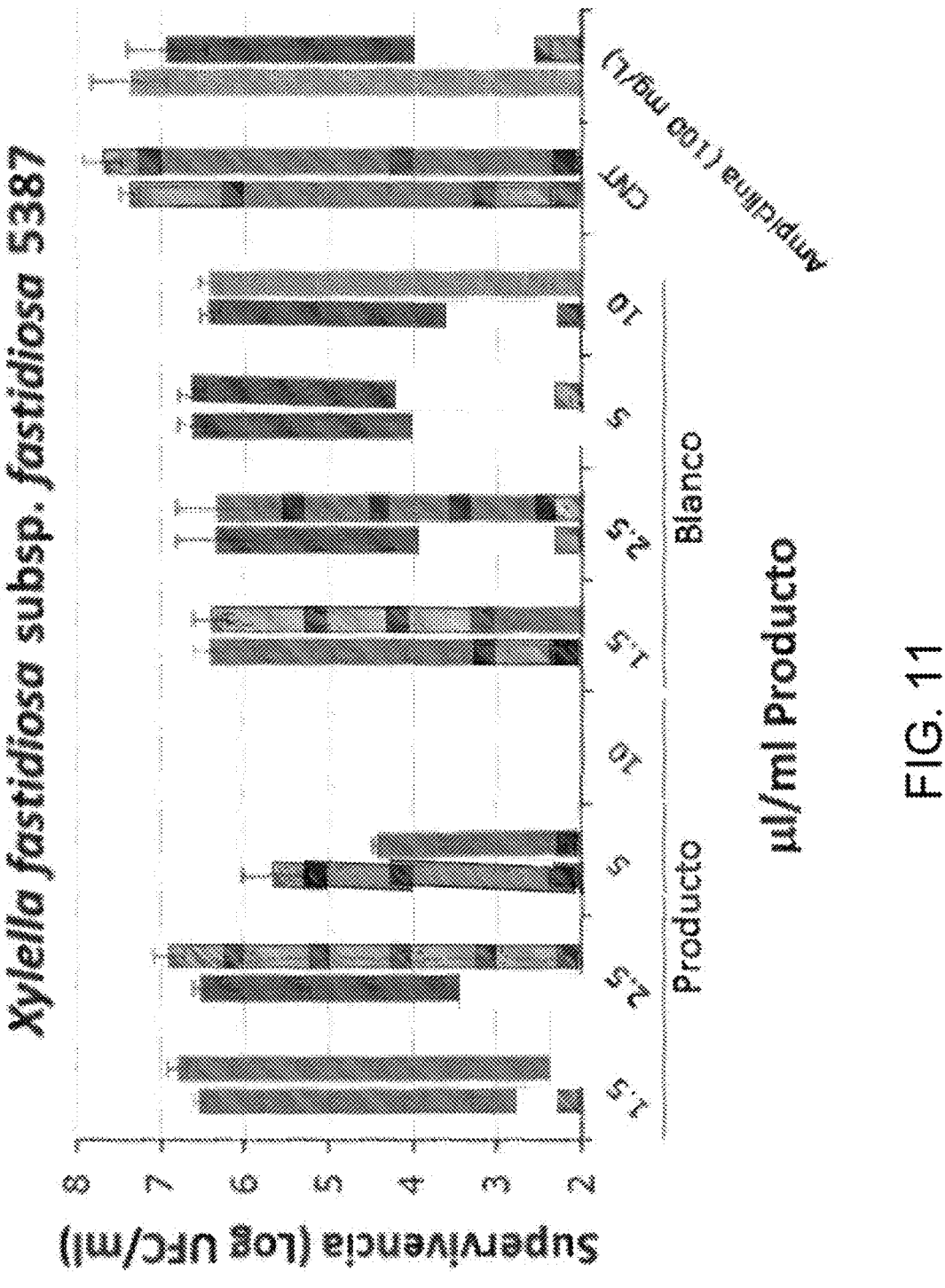
FIG. 11. Survival of *Xylella fastidiosa* subsp. *fastidiosa* depending on the treatment applied after 30 min and 2 h (in each pair of columns, the left corresponds to 30 min and the right to 2 hours) as described in example 8. The bars represent the average of the values observed in the three repetitions performed for each treatment and time. The error bars show the confidence interval taking into account the standard deviation.

The efficacy of the product was evaluated against *X. fastidiosa* subsp. *fastidiosa* (IVIA strain 5387.2). The tested product comprised eucalyptus oil in sufficient amount to have 20% w/v of 1,8-cineole (measured by HPLC) and was stored at room temperature. The inoculum was obtained from the pure culture of the actively growing strain, after seeding in BCYE agar medium and incubation at 28° C. for 7-10 days. The bacterial suspension was prepared at a final concentration of $1\times10^8$ CFU/ml. Bactericidal activity was evaluated at 4 concentrations of the product: 1.5, 2.5, 5 and 10 μl/ml. In addition, the effect of the product was compared with the blank (formulation without 1-8-cineole), as well as with the antibiotic ampicillin at a concentration of 100 mg/l. An untreated control was also included, where the product was replaced by sterile distilled water. The trials were conducted as described in Example 3 and the results are illustrated in FIG. 11.

At 30 minutes of exposure to the antibiotic ampicillin, a median survival of 100% was quantified. However, after 2 hours of exposure it decreased to values of 20.6%. This is normal considering that it is an antibiotic that affects the synthesis of the wall in bacteria and its lethal effect is delayed.

At 30 and 120 min of contact with the product, no survival of *X. fastidiosa* subsp. *fastidiosa* at the highest tested concentration (10 μl/ml, 100% mortality). At doses of 1.5, 2.5 and 5 μl/ml, a significant reduction in survival was observed, presenting a range of values of 11.8-14.9%, 14.3-15.6% and 0.05-2.9%, respectively. In general, it was observed that as the dose of the product was increased, the survival of *X. fastidiosa* subsp. *fastidiosa* decreased. The bactericidal effect of the product at a concentration of 5 μl/ml increased significantly with increasing exposure time (30 min, survival of 2.8%; 120 min, survival of 0.05%). The DL50 of the product was 1.15 μl/ml at 30 min and 1.08 μl/ml at 120 min.

These results show a powerful bactericidal action of the product of the invention against *X. fastidiosa* subsp. *fastidiosa*.

The invention claimed is:

1. A method for protecting a plant from bacterial infection, said method comprising applying a liquid composition comprising *eucalyptus* oil comprising 1,8-cineole,
wherein the composition comprises between 15 and 25% w/v of 1,8-cineole based on a total volume of the composition,
wherein said composition further comprises at least one viscosizer in a sufficient amount so that the viscosity of the composition is between 500 and 5000 cP, calculated according to the Collaborative International Pesticides Analytical Council Miscellaneous Technique (CIPAC MT) 192 method with a rotational viscometer with needle 2, 20 rpm and at 25° C.,
wherein said eucalyptus oil is the only ingredient with bactericidal effect in the composition,
wherein a use solution of said composition is applied to plants after being diluted in water up to between 0.01 and 12% by weight, and
wherein said protection is against infections of *Xylella fastidiosa*.

2. The method of claim 1, wherein said protection is applied to grapevine, olive, almond, hazel, walnut, kiwi, tomato, strawberry, potato, peach, apricot, plum, orange, lemon, mandarin, apple, pear, quince, or coffee trees.

3. The method of claim 1, wherein said composition further comprises at least one diluent, at least one surfactant and at least one antioxidant.

4. The method of claim 1, wherein said composition further comprises between 40 and 70% w/v of diluent or diluents, wherein at least one diluent is water.

5. The method of claim 1, wherein said composition comprises between 40 and 70% w/v of water.

6. The method of claim 1, wherein said composition has a volumetric particle size distribution with d10 between 0.1 and 5 microns and d90 between 0.8 and 50 microns, measured by laser diffraction according to the CIPAC MT 187 method.

\* \* \* \* \*